Aug. 22, 1961            I. S. PFEFER            2,997,083
LAMINATING PRESS INCLUDING LOADING AND UNLOADING
TABLES MOVABLE WITH PLATEN UNDER A CONVEYOR
Filed July 29, 1959            3 Sheets-Sheet 1
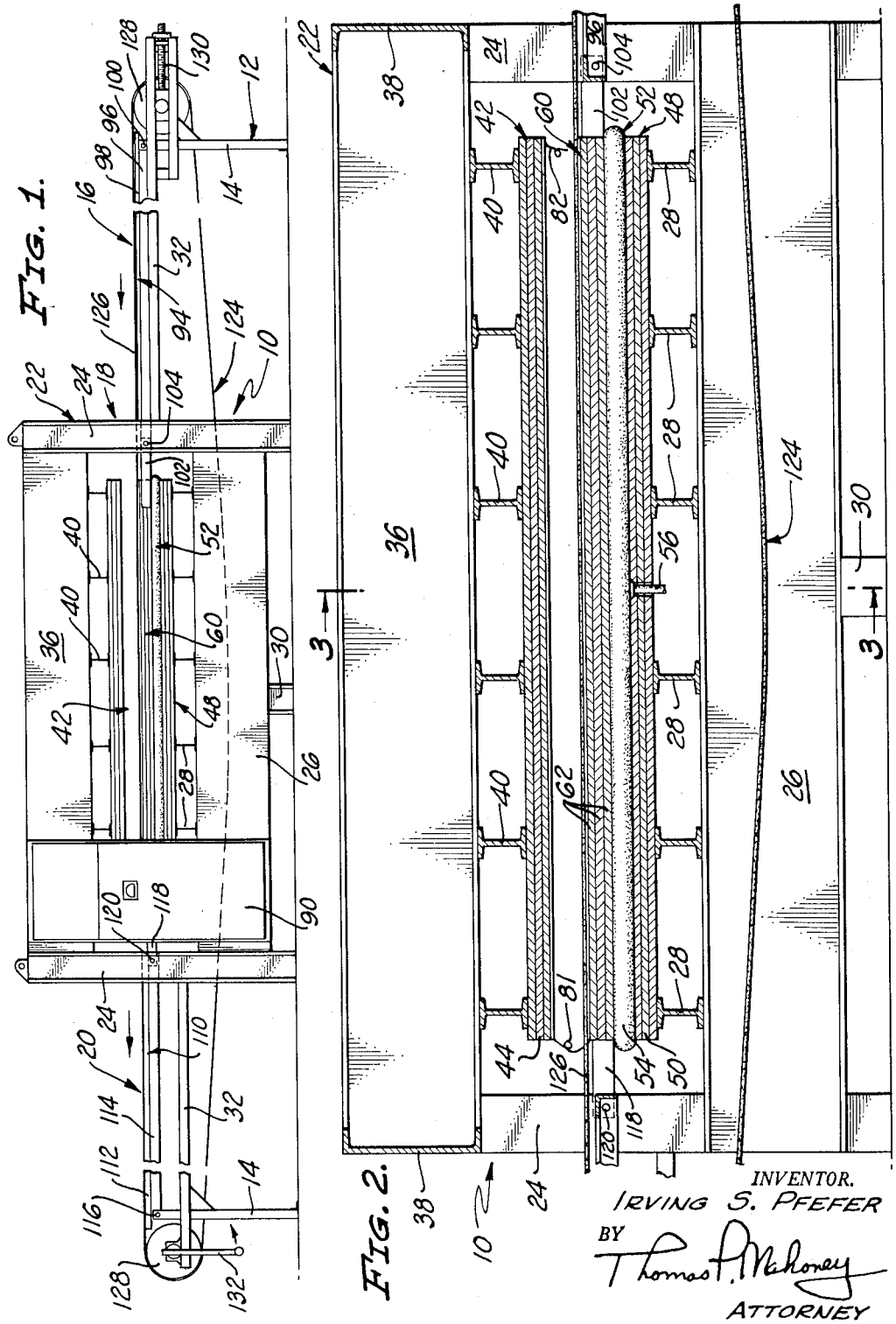
INVENTOR.
IRVING S. PFEFER
BY
Thomas P. Mahoney
ATTORNEY Aug. 22, 1961  I. S. PFEFER  2,997,083
LAMINATING PRESS INCLUDING LOADING AND UNLOADING
TABLES MOVABLE WITH PLATEN UNDER A CONVEYOR
Filed July 29, 1959  3 Sheets-Sheet 2
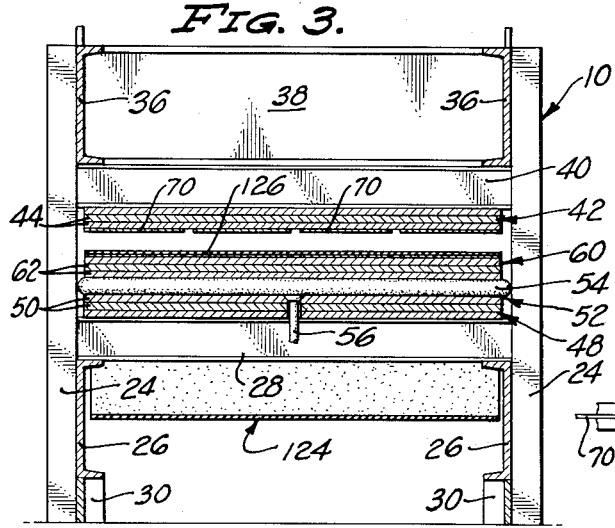
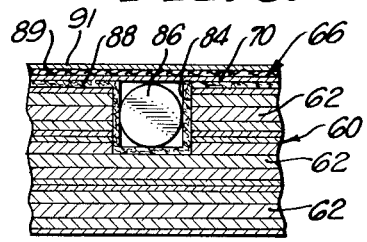
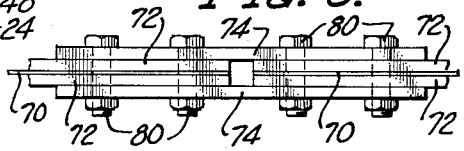
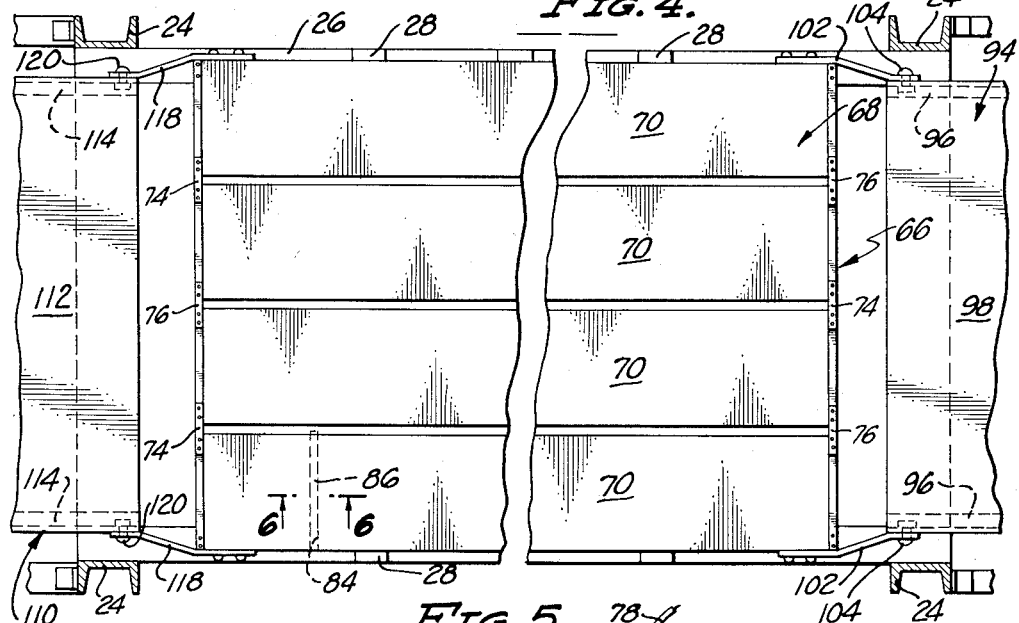
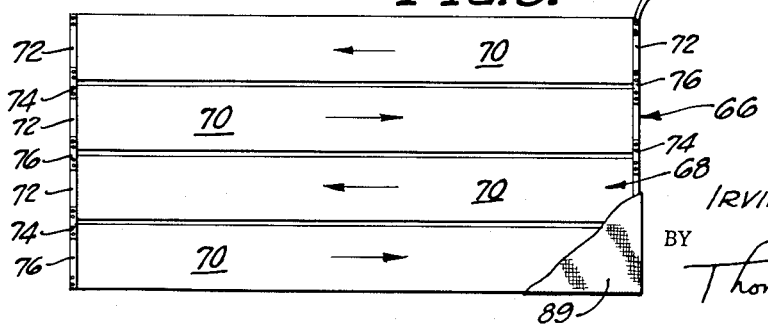
INVENTOR.
IRVING S. PFEFER
BY Thomas P. Mahoney
ATTORNEY

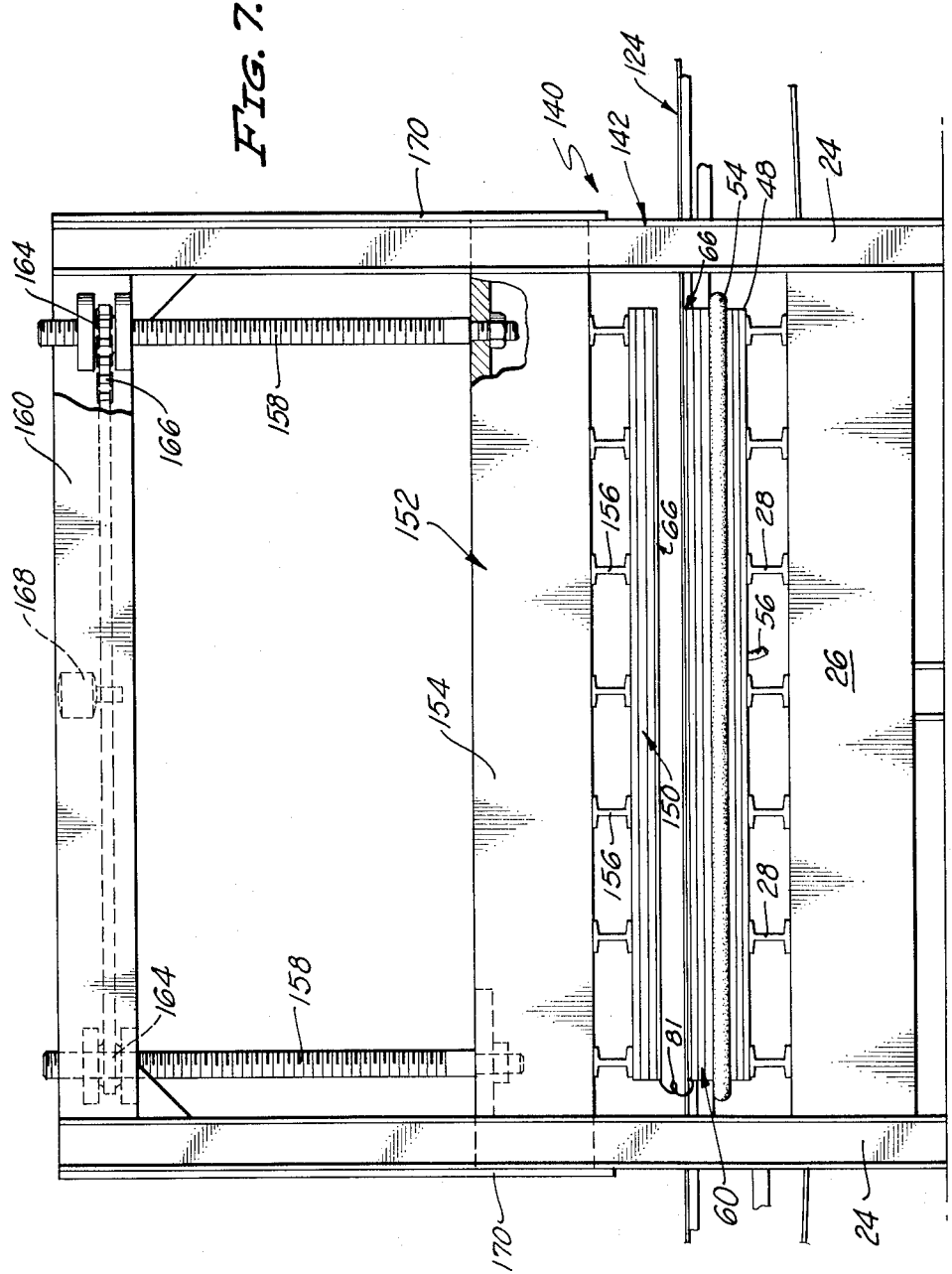

United States Patent Office 2,997,083
Patented Aug. 22, 1961

2,997,083
LAMINATING PRESS INCLUDING LOADING AND UNLOADING TABLES MOVABLE WITH PLATEN UNDER A CONVEYOR
Irving S. Pfefer, Van Nuys, Calif., assignor to Thermo-Pneu Corporation, Glendale, Calif., a corporation of California
Filed July 29, 1959, Ser. No. 830,283
10 Claims. (Cl. 144—281)

This invention relates to a laminating press and, more particularly, to a laminating press adapted to be utilized in laminating various types of articles by the application of pressure, or heat and pressure, to said articles.

Among the problems confronted in the laminating of various types of wood and plastic sheets to one another, or to the surfaces of such articles as case goods, is the difficulty encountered in loading and unloading the articles to be laminated into or from the press. With conventional presses it is customary to place the superimposed laminations or the case goods with the laminae upon the surfaces thereof upon the movable platen of the press and to vertically move the platen to subject the laminates or the case goods disposed upon the movable platen to pressure by moving the movable platen toward a fixed platen to accomplish the lamination of the same.

It is therefore, an object of my invention to provide a laminating press which is characterized by the provision of loading and unloading stations disposed on opposite sides of the laminating station, loading and unloading tables being provided at said loading and unloading stations, respectively, whereby articles to be laminated may be loaded while other articles are being laminated, and whereby articles which have been laminated may be unloaded while other articles are being laminated. Therefore, the down-time customarily incident to the operation of conventional devices of the character under consideration here is eliminated, since preliminary loading and subsequent unloading of articles can take place while the press is functioning to accomplish lamination of articles located at the laminating station.

Another object of my invention is the provision, in a press of the aforementioned character, of an endless conveyer constituted by a conveyer belt, or the like, which extends between the loading and unloading stations and through the laminating station. Therefore, articles loaded upon the belt at the loading station can be conveyed to the laminating station simultaneously with the removal of laminated articles from the laminating station.

An additional object of my invention is the provision, in a press of the aforementioned character, of a loading table at the loading station which is operatively secured to one side of the laminating platen and an unloading table at the unloading station which is operatively secured to the other side of the laminating platen in order that the adjacent edges of said tables and said platen may be maintained in contiguity to each other during the loading and unloading operations and in order that the upper run of the conveyer belt may be supported at all times by the juxtaposed edges of said loading tables and the associated platen.

Because of the provision of the continuous belt and the loading and unloading stations in the press of my invention, it is possible to sequentially laminate extremely long articles which have not been amenable to press lamination because of the limited capacity of prior art presses. In other words, an elongated article can have portions thereof supported at the loading and unloading stations while intermediate portions thereof are successively subjected to the laminating process at the laminating station. Therefore, the length of articles which can be laminated is relatively unlimited since the opposite extremities of the articles can protrude into overlying relationship with the loading and unloading stations of the press.

Another object of my invention is the provision, in a laminating press of the aforementioned character, of means for causing vertical movement of the movable platen of the press constituted by a unitary air bag underlying said movable platen and adapted to vertically move the same when air under pressure is fed thereinto.

The press of my invention can be utilized in either hot or cold pressing and I provide heater means associated with both the fixed and movable platens of the press and constituted by a plurality of strips of electrically conductive material which are disposed in spaced, side-by-side relationship with each other on the surfaces of the platens and which are connected in series by conductors at the opposite extremities thereof, insulators being inserted between the other extremities thereof to insure against shorting of said strips with respect to each other.

A further object of my invention is the provision of a laminating press of the aforementioned character which includes adjustment means on the fixed platen thereof whereby said fixed platen can be disposed at any suitable elevation to accommodate case goods or similar articles of considerable height.

Other objects and advantages of my invention will be apparent from the following specification and the accompanying drawings, which are for the purpose of illustration only, and in which:

FIG. 1 is a side elevational view of a press constructed in accordance with the teachings of my invention;

FIG. 2 is a longitudinal, sectional view taken at the laminating station of said press;

FIG. 3 is a vertical, sectional view taken on the broken line 3—3 of FIG. 2;

FIG. 4 is a top plan view of the movable platen of the laminating press;

FIG. 5 is an enlarged, fragmentary, sectional view showing a portion of the heater means utilized in conjunction with the fixed and movable platens of the press;

FIG. 6 is a transverse, sectional view taken on the broken line 6—6 of FIG. 4;

FIG. 7 is a vertical, sectional view of an alternative embodiment of the press of my invention showing means for vertical adjustment of the fixed platen thereof; and FIG. 8 is an enlarged, fragmentary, end elevational view showing the operative connection between adjacent ends of the heater strips incorporated in the heater means for the platens of the press.

Referring to the drawings and particularly to FIGS. 1-2 thereof, I show a laminating press 10 constructed in accordance with the teachings of my invention and including an elongated frame 12, said frame incorporating a plurality of vertical standards 14 at its opposite extremities and including a loading station 16, a laminating station 18, and an unloading station 20. A press structure 22 is located intermediate the extremities of the frame 12 and includes a plurality of corner posts 24 which support horizontally oriented beams 26 having I-beams 28 extending transversely of the beams 26 and an intermediate post 30 engages each of the beams 26 between the extremities thereof.

Longitudinal members 32 extend inwardly from the vertical standards 14 and are connected at their inner extremities to the corner posts 24 by means of welding or other fastening expedients. The corner posts 24 are connected at their upper extremities by longitudinal stiffening beams 36 and transverse stiffeners 38. I-beams 40 are affixed to the lower edges of the stiffening beams 36 and support a fixed platen 42 constituted by a plurality of sheets 44 of plywood or the like. The sheets 44 of plywood are laminated to each other and are secured to the transversely oriented I-beams 40 by means of bolts or similar fasteners, not shown.

A bed 48 constituted by a plurality of superimposed sheets 50 of plywood is supported upon and securely affixed to the upper extremities of the transversely oriented I-beams 28, and platen actuating means 52 constituted by a unitary air bag structure 54 is superimposed on the bed 48 and connected by means of an air line 56 to a suitable source of air under pressure.

The air bag 54 is fabircated from nylon fabric impregnated with a suitable impregnant such as neoprene or the like and, when inflated is adapted to vertically move a movable platen 60 toward the fixed platen 42, said movable platen being constituted by a plurality of sheets 62 of plywood or the like which are laminated to each other or otherwise positively affixed in co-operative relationship.

The provision of the unitary air bag 54 permits the equal distribution of pressure across the platens 42 and 60 and the use of low pressure laminating techniques. The number of air lines to the bag 54 is determined by the size of the bag and a single manifold, not shown, may be secured to the bed 48 from which the air lines may run to the bag 54.

Each of the platens 42 and 60 has heater means 66 mounted upon the surface thereof adapted to engage against a work piece and, as best shown in FIGS. 4–6 and 8 of the drawings, the heater means is constituted by a plurality of heating elements 68 fabricated from .020–¼ hard stainless steel strips 70.

The stainless steel strips 70 are disposed in parallel relationship with each other and their extremities mounted between copper bus bars 72, as best shown in FIGS. 4–5 and 8 of the drawings. At one extremity each of the strips 70 is connected by a pair of copper connectors 74 to establish a series relationship between said extremities while, at the opposite extremities of the juxtaposed strips, insulating bars 76 of a suitable, heat resistant dielectric are connected between the juxtaposed extremities to prevent the juxtaposed extremities from shorting out with respect to each other and to maintain the strips in proper spaced relationship. A lead 78 connects the bus bar 72 of the heater means 66 on the movable platen 60 to the step down transformer, not shown, or other source of electrical energy. Both the copper connectors 74 and the insulating bars 76 are secured in operative relationship with the strip 70 and the bus bar 72 by means of bolts 80, as best shown in FIG. 8 of the drawings. A jumper 81, FIG. 2, connects the heater means 66 on the movable platen 60 electrically to the heater means 66 on the fixed platen. A return lead 82 connects the heater means 66 on the fixed platen 42 to the other side of the welding transformer to the other side of the other source of electrical energy.

One of the platens 42 and 60 incorporates grooves 84 in the surface thereof immediately adjacent the underside of one of the strips 70 and a thermostatic probe or capillary 86 is located in each of the grooves to detect the temperature of the juxtaposed strip 70 and to prevent heating of the heating elements 68 constituted by the strips 70 beyond a predetermined temperature. A layer 88 of asbestos is superimposed on the surface of each of the platens 42 and 60 and is adapted to isolate the strips 70 from direct contact with the surface of the respective platen.

The strips 70 are covered by a layer 89 of .004 to .006 inch thick glass cloth. If desired, an aluminum cowl 91 is placed over the surface of the platen to prevent abrasion of the heating means 66 and to achieve finer finishes on certain laminates. The glass cloth 89 serves as an insulator between the cowl 91 and the heating elements 70.

The edges of the asbestos and cloth layers 88 and 89 are stapled to the edges of the platens 42 and 60 and the side edges of the edges of the cowl 91 are loosely secured to their associated platens to permit expansion or contraction thereof.

When the cowl 91 is used, it holds the heating means 66 in place. If the cowl 91 is not used, the strips 70 are fastened by a suitable latex adhesive to the surfaces of the platens and the glass cloth and asbestos layers eliminated.

The thermostat 86 is connected to suitable controls, not shown, located in the enclosure 90, as best shown in FIG. 1 of the drawings, said enclosure also incorporating the current generators and other controls essential to the operation of the press.

A loading table 94 is supported on the frame 12 at the loading station 16 and includes a pair of longitudinal supports 96 formed from angle iron or the like and having the table top 98 supported thereupon, said table top being constituted by a sheet of plywood or similar material. The outer extremities of the supports 96 are pivotally connected to the vertical standards 14, as at 100, and their inner extremities are pivotally connected to the juxtaposed edge of the movable platen 60 by means of brackets 102 and pivot pins 104. A gap of approximately two to three inches is left between said platen and loading table.

Therefore, when the movable platen 60 is raised or lowered by the action of the air bag 54, corresponding upward or downward movement of the loading table 94 occurs and, therefore, the juxtaposed end of the loading table 94 and edge of the platen 60 are always maintained in alignment with each other.

Mounted on the opposite extremity of the frame 12 is an unloading table 110 having a table top 112 pivotally supported upon longitudinally oriented supports 114. The outer extremities of the supports 114, which may be fabricated from angle iron or the like, are pivotally secured, as at 116, to the vertical standards 14, and at their inner extremities are pivotally secured by means of brackets 118 and pivot pins 120 to the juxtaposed edge of the movable platen 60.

Therefore, as in the case of the loading table 94, the unloading table 110 moves with the platen 60 when said platen is raised or lowered by the action of the air bag 54 and, in this manner, constant alignment of the juxtaposed extremity of the unloading table 110 and the edge of the platen 60 is achieved. While a specific connection of the loading and unloading tables 94 and 110 to the respective edges of the movable platen 60 has been illustrated, it will be obvious to one skilled in the art that various type of connections may be utilized without materially altering the manner in which the concomitant movement and alignment of the loading and unloading tables 94 and 110, respectively, with the juxtaposed edges of the movable platen 60 can be accomplished.

An endless conveyer belt 124 has its upper run 126 disposed in overlying relationship with the loading table 94, the movable platen 60 and the unloading table 110. The endless conveyer belt 124 is entrained upon belt pulleys 128 located at opposite extremities of the frame 12 and adjustment means 130 is associated with one of said pulleys to achieve and maintain the proper tension upon the belt 124. The other belt pulley 128 has a crank 132 affixed thereto to accomplish rotation of said pulley and, thus, to accomplish longitudinal translation of the belt 124 from the loading station 16 to the laminating station 18 and from the laminating station 18 to the unloading station 20. Since the belt 124 overlies the loading table 94, the movable platens 60 and the unloading table 110, it constitutes a continuous web whereby an article or work piece disposed upon the belt 124 at the loading table 94 may be easily transported onto the platen 60 when the air bag 54 is deflated. When the article or work piece has been properly laminated, deflation of the air bag 54 will permit the actuation of the belt 124 to carry the work piece into overlying relationship with the movable unloading table 110. Of course, a motor may be provided to actuate the belt 124.

Because of the pivotal connection between the juxtaposed extremities of the loading and unloading tables 94 and 110 to the opposite edges of the movable platen 60, the transition between the movable loading and unloading tables and said platen is never significant and the upper run 126 of the belt 124 can readily accomplish the movement of a work piece through the various stations, as described immediately hereinabove. Furthermore, the upper run 126 of the belt 124 is supported at the loading and unloading stations 16 and 20 by the tables 94 and 110 during the laminating operation.

An alternative embodiment 140 of the press of my invention is shown, in part, in FIG. 7 of the drawings. Those portions of the previously disclosed laminating press 10 are identified by corresponding reference numerals. In any event, the only changes in the alternative embodiment 140 are to be found in the press structure 142 which is associated with the belt 124 and the loading table 94 and unloading table 110 in the same manner as the previously disclosed press structure 22. The press structure 142 includes corner posts 24 having longitudinally extending beams 26 extending therebetween. I-beams 28 superimposed on the beams 26 support the bed 48 and the associated air bag 54 and movable platen 60 in the same manner as in the previously discussed embodiment of the invention.

However, a platen 150 co-operative with the movable platen 60 is mounted for adjustment on a vertically movable carriage 152, said carriaget consisting of longitudinally extending frame members 154, only one of which is shown, having I-beams 156 secured to the lower edges thereof and supporting the platen 150. Lead screws 158 are secured to the four corners of the carriage and have their upper extremities extending through a longitudinally oriented support 160. Mounted for movement with respect to and in encompassing relationship with the upper extremities of the lead screws 158 are nuts 164 which are rotatable by means of a link chain 166 actuatable by an electric motor 168.

Therefore, when it is desired to increase the space between the movable platen 60 and the relatively fixed platen 150, the relatively fixed platen 150 can be adjusted vertically with respect to the movable platen 60 by starting the electric motor 168 to rotate the nuts 164 and raise the lead screws 158. Upward movement of the lead screws 158 is accompanied by corresponding upward movement of the carriage 152 which causes the corresponding upward movement of the relatively fixed platen 150. In this manner, the relatively fixed platen 150 can be raised to a height which will permit the press structure 140 to accommodate case goods and other work pieces characterized by substantially greater height than articles customarily accommodated in laminating presses. Therefore, it is possible to laminate veneers and other surfaces upon case goods in the press structure 140 by merely raising or lowering the relatively fixed platen 150 to accommodate the case goods.

In order to prevent endwise movement of the carriage 152, end plates 170 are provided on the corner posts 24 and are engaged by the extremities of the longitudinally extending frame members 154 during vertical movement of the carriage 152 within the press structure 140. The platens 60 and 150 are, of course, provided with heater means 66 so that hot laminating of work pieces between the platens 60 and 150 can be accomplished.

In utilizing the laminating press of my invention for cold laminating, it is merely necessary to place a work piece on the conveyor belt 124 at the loading station 16 and the work piece will be supported by the loading table 94 underlying the upper run 126 of the conveyor belt. A conveyor belt 124 is then actuated to move the work piece from the loading station into the laminating station where the work piece underlies the platen 42 and the belt extends into overlying relationship with the movable platen 60. Air under pressure is then fed into the air bag structure 54 to raise the movable platen 60 against the work piece and thus compress the opposite surfaces thereof between the fixed and movable platens 42 and 60, respectively. After the lamination of the work piece has been accomplished, air is released from the air bag 54 and the belt 124 actuated to transport the work piece to the unloading station 20 where the work piece is supported upon the unloading table 110 until it can be removed therefrom.

During the laminating operation another work piece can be assembled upon the belt 124 at the loading station 16 so that, when the platens 42 and 60 are separated and the work piece moved from the laminating station 18 to the unloading station 20, a new work piece will be moved from the loading station 16 to the laminating station 18. In this manner, the time customarily consumed in placing work pieces directly on the movable platen 60 and locating them with respect to the platen is eliminated since the work piece can be located and assembled on the upper run 126 of the conveyor belt 124 at the loading station 16.

Furthermore, the pivotal connections between the opposite edges of the movable platen 60 and the loading and unloading tables 94 and 110, respectively, permit free movement of the belt 124 over the surfaces of said tables and the platen 60 located therebetween and insure alignment of the juxtaposed extremities of said tables with the contiguous edges of said platen.

In hot lamination of a work piece, the heater means 66 associated with the fixed and movable platens 42 and 60, respectively, are energized to expose the opposite sides of the work piece to heat and pressure and to accomplish the curing of the adhesives being utilized in accomplishing the laminating process. The thermostatic probe 86 is exposed to the elongated heating elements 68 constituted by the stainless steel strips 70 and prevents overheating of the work piece and the heater means 66. Automatic controls, not shown, of heat and pressure, and automatic timers, not shown, determine the opening and closing of the press. If desired, the laminating press can be completely automated to accomplish the sequential and automatic timing of the laminating process for particular types of work pieces.

The provision of a unitary air bag structure 54 insures equally distributed pressure upon the platen 60 despite its relatively large area so that both large and small work pieces can be successfully laminated in the laminating press 10. In addition, the equal distribution of heat by the heater means 66 and the fact that the heater means 66 can be energized from any available source of electric power materially reduces the costs of installing and operating the laminating press 10. Moreover, the strips 70 constituting the heater means 66 can be disconnected from each other to reduce the heating area when small articles are to be laminated.

I claim:

1. In a press, the combination of: a movable platen; an endless belt located in overlying relationship with said movable platen and having its opposite extremities disposed beyond said platen; a loading table pivotally connected to one side of said platen and underlying said belt; and an unloading table pivotally connected to the other side of said platen and underlying said belt.

2. In a laminating press, the combination of: a laminating station having a movable platen located at said station and adapted to receive a work piece; a loading station located at one side of said laminating station and including a loading table operatively secured to said platen for movement therewith; an unloading station disposed at the other side of said laminating station and having an unloading table operatively connected to the other side of said platen and movable therewith; and an endless belt having its upper run disposed in overlying relationship with said loading table, said platen and said unloading table.

3. In a laminating press, the combination of: a laminating station having a movable platen located at said station and adapted to receive a work piece; a loading station located at one side of said laminating station and including a loading table operatively secured to said platen for movement therewith; an unloading station disposed at the other side of said laminating station and having an unloading table operatively connected to the other side of said platen and movable therewith; and a conveyer extending in overlying relationship with said loading table, said platen and said unloading table, and adapted to transport a work piece from said loading station to said laminating station and from said laminating station to said unloading station.

4. In a laminating press, the combination of: a loading table located at a loading station at one side of said press; an unloading table located at an unloading station at the other side of said press; a platen located intermediate said loading and unloading tables at a laminating station intermediate said loading and unloading stations, said platen having said loading and unloading tables operatively connected thereto for conjoint movement therewith; and a conveyer disposed in overlying relationship with said loading and unloading tables and said platen whereby a work piece may be transported from said loading station to said laminating station and from said laminating station to said unloading station.

5. In a laminating press, the combination of: a loading table located at a loading station at one side of said press; an unloading table located at an unloading station at the other side of said press; a platen located intermediate said loading and unloading tables at a laminating station intermediate said loading and unloading stations, said platen having said loading and unloading tables operatively connected thereto for conjoint movement therewith, the operative connection between said platen and said loading and unloading tables being constituted by a pivotal connection adapted to permit simultaneous and relative movement by and between said platen and said loading and unloading tables; and a conveyer disposed in overlying relationship with said loading and unloading tables and said platen whereby a work piece may be transported from said loading station to said laminating station and from said laminating station to said unloading station.

6. In a laminating press, the combination of: an elongated frame; a loading station at one end of said frame having a loading table disposed thereat; a platen mounted intermediate the extremities of said frame for vertical movement with respect thereto, said platen being located at a laminating station adjacent said loading station; pneumatic means on said frame for causing movement of said platen relative to said frame; an unloading station at the other extremity of said frame having an unloading table located thereat, said loading and unloading tables being operatively connected to said platen and movable conjointly with said platen when said platen is moved by said pneumatic means; and a conveyer belt having its upper run disposed in overlying relationship with said loading table, said platen and said unloading table, to transport a work piece from said loading table to said platen and from said platen to said unloading table.

7. In a laminating press, the combination of: an elongated frame; a loading station at one end of said frame having a loading table disposed thereat; a platen mounted intermediate the extremities of said frame for vertical movement with respect thereto, said platen being located at a laminating station adjacent said loading station; pneumatic means on said frame for causing movement of said platen relative to said frame; an unloading station at the other extremity of said frame having an unloading table located thereat, said loading and unloading tables being pivotally connected to said platen and movable conjointly with said platen when said platen is moved by said pneumatic means; and a conveyer belt having its upper run disposed in overlying relationship with said loading table, said platen and said unloading table, to transport a work piece from said loading table to said platen and from said platen to said unloading table.

8. In a laminating press, the combination of: an elongated frame having a loading station at one extremity and an unloading station at the other extremity thereof and having a laminating station located intermediate said loading and unloading stations; a loading table pivotally mounted on said frame at said loading station; an unloading table pivotally mounted on said frame at said unloading station; a platen mounted on said frame for vertical movement at said laminating station; pneumatic air bag means for causing vertical movement of said platen; heater means on the upper surface of said platen for engagement with the contiguous area of a work piece, said heater means being constituted by a plurality of metallic strips each having one end secured in conductive relationship with an adjacent strip and its other end insulated from said adjacent strip; theremostatic means in said platen for limiting the temperature of said heater means; and a conveyer belt having its upper run disposed in overlying relationship with said loading table, said platen and said unloading table, whereby said work piece may be transported from said unloading table to said platen and from said platen to said unloading table.

9. In a laminating press, the combination of: an elongated frame having a loading station at one extremity and an unloading station at the other extremity thereof and having a laminating station located intermediate said loading and unloading stations; a loading table pivotally mounted on said frame at said loading station; an unloading table pivotally mounted on said frame at said unloading station; a platen mounted on said frame for vertical movement at said laminating station; pneumatic air bag means for causing vertical movement of said platen; heater means on the upper surface of said platen for engagement with the contiguous area of a work piece, said heater means being constituted by a plurality of metallic strips each having one end secured in conductive relationship with an adjacent strip and its other end insulated from said adjacent strip; thermostatic means in said platen for limiting the temperature of said heater means, said loading and unloading tables being pivotally connected to the opposite sides of said platen to cause conjoint movement of said platen and said loading tables when said air bag means is energized to cause vertical movement of said platen at said laminating station; and a conveyer belt having its upper run disposed in overlying relationship with said loading table, said platen and said unloading table, whereby said work piece may be transported from said loading table to said platen and from said platen to said unloading table.

10. In a laminating press, the combination of: an elongated frame having a loading station at one extremity and an unloading station at the other extremity thereof and having a laminating station located intermediate said loading and unloading stations; a loading table mounted on said frame at said loading station; an unloading table mounted on said frame at said unloading station; a platen mounted on said frame for vertical movement at said laminating station; pneumatic air bag means for causing vertical movement of said platen; and a conveyer belt having its upper run disposed in overlying relationship with said loading table, said platen and said unloading table, whereby a work piece may be transported from said loading table to said platen and from said platen to said unloading table.

References Cited in the file of this patent

UNITED STATES PATENTS

| | | |
|---|---|---|
| 1,906,897 | Ballentine | May 2, 1933 |
| 2,142,932 | Beard | Jan. 3, 1939 |
| 2,275,780 | Maloney | Mar. 10, 1942 |
| 2,310,325 | Smith | Feb. 9, 1943 |
| 2,597,923 | Craston | May 27, 1952 |
| 2,627,291 | Smith et al. | Feb. 3, 1953 |
| 2,657,160 | Craston | Oct. 27, 1953 |